United States Patent [19]

Birkett

[11] Patent Number: 4,641,594
[45] Date of Patent: Feb. 10, 1987

[54] CANOE CONVERSION KIT
[76] Inventor: Harry Birkett, 4648-83 Street NW., Calgary, Alberta, Canada, T3B 2R2
[21] Appl. No.: 778,946
[22] Filed: Sep. 23, 1985
[30] Foreign Application Priority Data
Oct. 26, 1984 [CA] Canada .................................. 466465
[51] Int. Cl.⁴ ............................................ B62B 15/00
[52] U.S. Cl. ..................................... 114/43; 114/347; 180/2.2; 280/810
[58] Field of Search .......................... 114/39, 43, 347; 180/2.2; 280/12 A, 213, 810
[56] References Cited

U.S. PATENT DOCUMENTS

| | | | |
|---|---|---|---|
| 2,238,464 | 4/1941 | Fletcher | 114/39 |
| 2,351,542 | 6/1944 | Paull | 114/43 |
| 3,051,503 | 8/1962 | Halperin | 180/2.2 |
| 3,139,057 | 6/1964 | Black | 114/43 |
| 3,902,443 | 9/1975 | McDougall | 114/39 |
| 4,061,100 | 12/1977 | Muhlfeld | 114/43 |
| 4,498,683 | 2/1985 | Johann | 114/43 |

Primary Examiner—Trygve M. Blix
Assistant Examiner—Thomas J. Brahan

[57] ABSTRACT

A kit for use alone as an iceboat or for easy mounting on a canoe to convert the canoe to a sailboat, includes a light-weight, rectangular frame with a front crossbar for receiving a mast, a rear crossbar for supporting a seat and a rear ice runner, and a pair of arms which can be folded against the frame or extended outwardly from the front crossbar for receiving front ice runners or portions of their outer ends.

5 Claims, 6 Drawing Figures

U.S. Patent   Feb. 10, 1987   Sheet 2 of 3   4,641,594
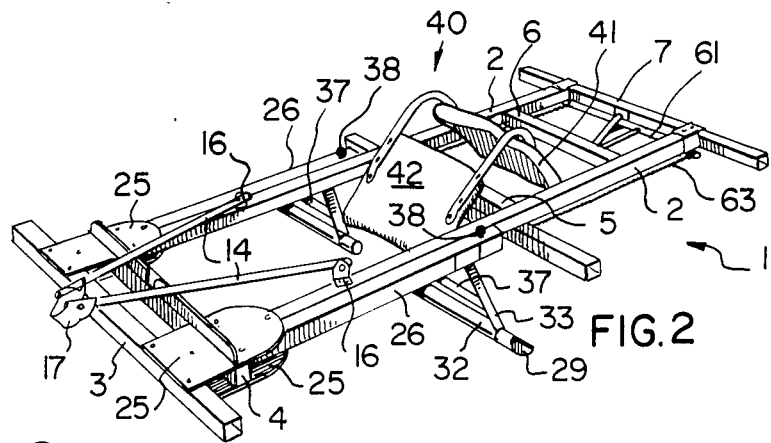
FIG. 2
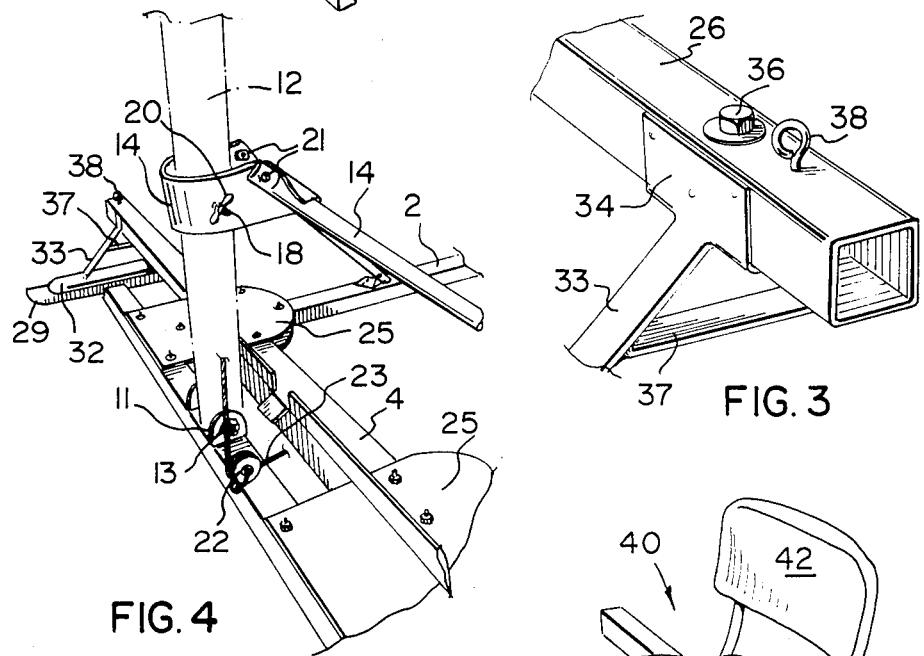
FIG. 4
FIG. 3
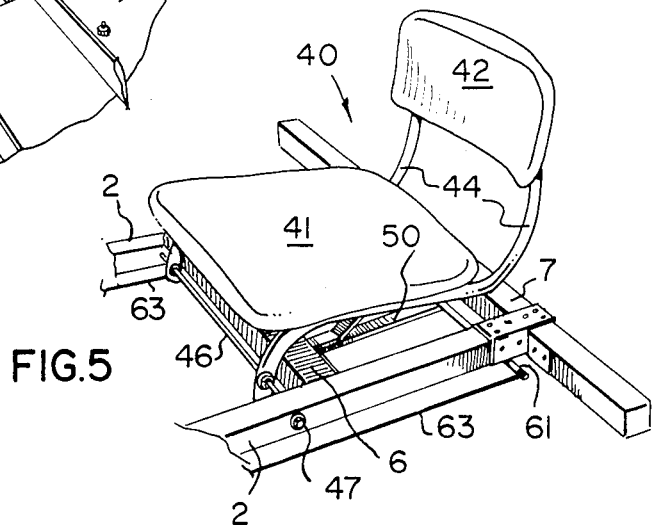
FIG. 5

CANOE CONVERSION KIT

BACKGROUND OF THE INVENTION

This invention relates to an iceboat kit for converting a canoe to a sailboat.

Kits of generally the same type as proposed by applicant are described in U.S. Pat. Nos. 3,139,057 issued to J. O. Black on June 30, 1964 and 4,061,000 issued to F. J. Muhlfeld on Dec. 6, 1977. The Black kit is used to convert a conventional boat to an iceboat and includes a frame for strapping to the boat and flexible straps which extend beneath the boat. The Muhlfeld patent describes a kit for converting a sailboat to an iceboat including an elongated spar assembly for mounting to the hull of the boat and blades for connecting the spar assembly to the stern of the boat.

While the patented kits perform their intended function, they cannot be used alone as iceboats. Thus, there still exists a need for a simple iceboat kit for converting a canoe to a sailboat. The object of the present invention is to meet such need.

BRIEF SUMMARY OF THE INVENTION

Accordingly, the present invention relates to an iceboat kit for converting a canoe to a sailboat, comprising substantially rectangular frame means for mounting on the top side edges of the canoe between the bow and stern thereof, said frame means including front crossbar means and rear crossbar means for supporting the frame means on the canoe side edges; first bracket means on said front crossbar means for mounting a sail mast on said arm means adapted to extend outwardly from said front crossbar means for carrying pontoons or ice runners, seat means on said frame means proximate said rear crossbar means; and ice runner means on said frame means beneath said seat means, whereby when free of a canoe the kit can be used alone as an iceboat and when mounted on a canoe the kit converts the canoe to a sailboat.

BRIEF DESCRIPTION OF THE DRAWINGS

The invention will now be described in greater detail with reference to the accompanying drawings which show a preferred embodiment of the invention and wherein:

FIG. 2 is a perspective view from above and the front of a kit in accordance with FIG. 1;

FIG. 3 is a perspective view from above of one end of a runner supporting arm used in the kit of FIGS. 1 and 2;

FIG. 4 is a perspective view from above and the front of a portion of the frame of the kit of FIGS. 1 to 3;

FIG. 5 is a perspective view from above of a seat used in the kit of FIGS. 1 to 4.

DESCRIPTION OF THE PREFERRED EMBODIMENT

Figure 1:
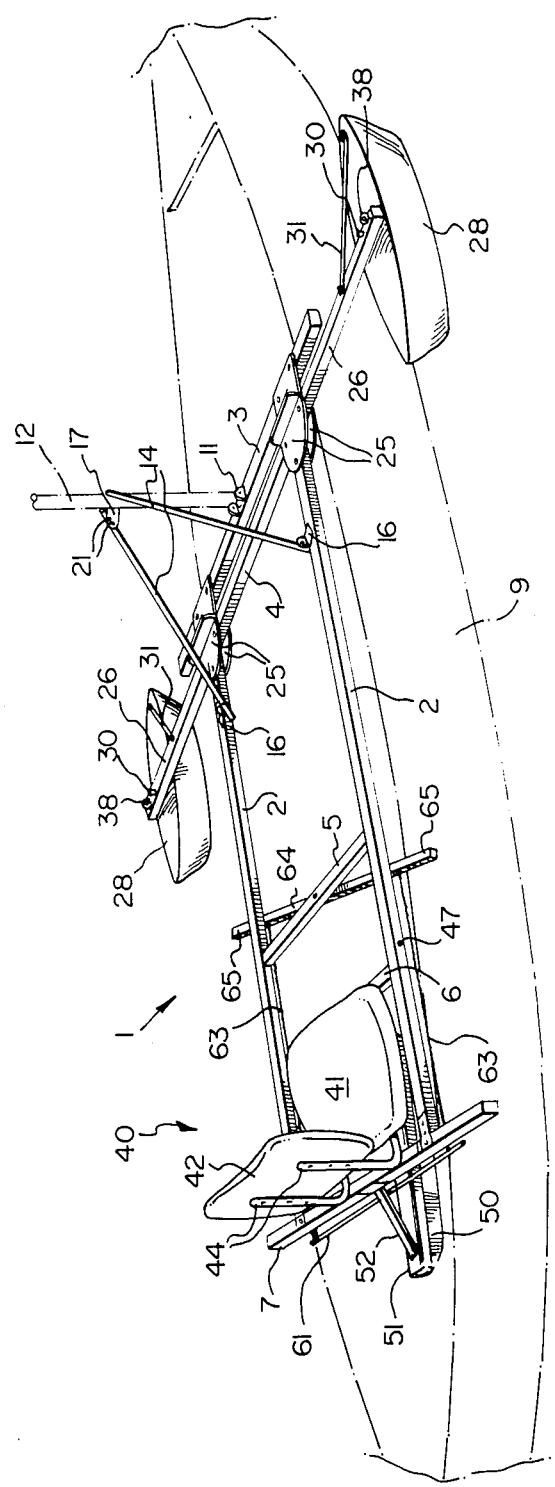
FIG. 1 is a schematic perspective view from above and the rear of an iceboat conversion kit in accordance with the present invention.

Referring to FIGS. 1 and 2 the kit of the present invention includes a rectangular frame generally indicated at 1. The frame 1 is defined by tubular metal sides 2 interconnected at their front ends, middle and rear ends by crossbars 3, 4, 5, 6 and 7. The front and rear crossbars 3 and 7 respectively, extend outwardly beyond the sides 2 for mounting the frame 1 on a canoe 9 (FIG. 1). Holes (not shown) are provided in the crossbars 3 and 7 for receiving screws for securing the frame to the usual aluminium molding on the top edges of the sides of the canoe 9.

A clevis 11 is provided on the front crossbar 3 for receiving a mast 12. The mast 12 is pivotally connected to the crossbar 3 by a bolt and nut 13. The connection between the frame 1 and the mast 12 is reinforced by diagonal braces 14 which extend between the mast 12 and the frame sides 2 during use. The braces 14 are connected to the sides 2 by brackets 16, and to the mast 12 by an arcuate metal plate 17, a bolt 18 and a wing nut 20. The ends of the plate 17 are connected to the braces 14 by bolts and nuts 21. A pulley 22 is also provided on the front crossbar for receiving a rope 23 for raising or lowering the sail (not shown). A pair of plates 25 are connected to each front side of the frame 1. The plates 25 are bolted to the crossbars 3 and 4 and to the front ends of the sides 2 for reinforcing the front end of the frame.

One end of an arm 26 is pivotally mounted between each pair of plates 25 for rotation between a position against the sides 2 (FIG. 2) and an outboard position (FIGS. 1 and 4). The arms 26 are intended to carry pontoons 28 (FIG. 1) or ice runners defined by blades 29 (FIGS. 2 to 4). Bolts 30 extend upwardly through holes (not shown) in the arms 26 for connecting the pontoons 28 to the arms. A diagonal brace 31 is provided between the front end of each pontoon 28 and each arm 26. The blades 29 are mounted in tubes 32 which define the bottom ends of generally triangular frames. A pair of arms 33 converge upwardly from each of the tubes 32 to a rectangular bracket 34 which is releasably connected to the outer end of the arm 26 by a bolt 36 (FIG. 3). A crossbar 37 extends between the arms 33 for reinforcing the blade frame. Eyebolts 38 are provided on the outer ends of the arms 26 for receiving the mast stays (not shown).

A chair generally indicated at 40 is mounted on the rear end of the frame 1. The chair 40 includes a seat 41 and a back rest 42 mounted on side bars 44. The front ends of the side bars 44 curve downwardly. A rod 46 (FIG. 5) with threaded ends extends through the sides 2 of the frame 1 and the side bars 44 for pivotally mounting the chair 40 on the frame. Nuts 47 secure the rod 46 in the frame 1. The chair 40 can be rotated around the rod 46 between the use position (FIG. 1) and the storage or non-use position (FIG. 2).

Figure 6:
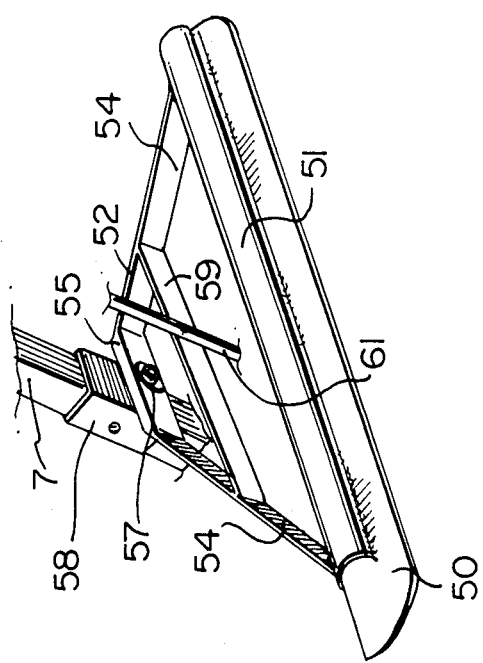
FIG. 6 is a perspective view from below of a rear runner assembly for use in the kit of FIGS. 1 to 5.

A blade 50 is mounted on the rear crossbar 7 beneath the chair 40. The blade 50 is mounted in a sleeve 51 which defines the bottom of a blade frame 52. The blade frame 52 (FIG. 6) includes arms 54 converging upwardly from near the ends of the sleeve 51 to a top bar 55. The blade frame 52 is pivotally connected to the rear crossbar 7 of the frame 1 by a bolt 57 extending upwardly through the top bar 55 and a generally U-shaped bracket 58 on the crossbar 7. A horizontal brace 59 extends between the arms 54 beneath the top bar 55. Rotation of the blade 50 is effected by a transversely extending rod 61 which is welded to the brace 59. Ropes 63 extend forwardly from the ends of the rod 61 to a steering lever 64. The steering lever 64 is an elongated crossbar which is pivotally mounted on the middle crossbar 5 beneath the frame. The ends 65 of the lever 64 are engaged by the feet of the iceboat driver to steer the iceboat.

While not shown in the drawings it will be appreciated that a rudder would normally be provided with the kit. The rudder and frame for mounting on the rear of the canoe 9 do not form part of the invention but would be necessary to steer the canoe when used as a sailboat. A variety of rudder frames would be required for use on different types of canoe.

In use as a sailboat the frame 1 is mounted on a canoe 9 (FIG. 1), the blades 29 are replaced by pontoons 28 and a sail and mast 12 are mounted on the front end of the frame 1. A rudder is mounted on the stern of the canoe 9 and the canoe is ready for use as a sailboat. When the kit is being used on a canoe sailboat the ends 65 of the lever 64 merely act as footrests. When intended for use as an iceboat (FIG. 2) the pontoons 28 are replaced by blades 29 and the arms are rotated outwardly to the use position (FIG. 4). A sail and mast 12 are mounted on the frame 1 and the iceboat is ready for use. For storage purposes or when the kit is to be carried on a trailer or other vehicle, as shown in FIG. 2, the arms 26 are folded in against the sides 2 of the frame 1 and the seat is rotated on the rod 46 to the forward position. With the mast 12 removed, the braces 14 and the plate 17 rotate downwardly around the brackets 16 to a rest position on the crossbar 4.

Thus there has been described a relatively simple kit, which can be used alone as an iceboat or which can easily be mounted on a canoe to convert the latter into a sailboat.

What I claim is:

1. An iceboat kit for converting a canoe to a sailboat, comprising substantially rectangular frame means for mounting on the top side edges of the canoe between the bow and stern thereof, said frame means including front crossbar means and rear crossbar means for supporting the frame means on the canoe side edges; first bracket means on said front crossbar means for mounting a sail mast on said frame means; arm means adapted to extend outwardly from said front crossbar means for carrying pontoons on ice runners, seat means on said frame means proximate said rear crossbar means; and ice runner means on said frame means beneath said seat means, whereby when free of a canoe the kit can be used alone as an iceboat and, when mounted on a canoe, the kit converts the canoe to a sailboat.

2. An iceboat kit according to claim 1, including second bracket means pivotally mounting said ice runner means on said frame means; and lever means mounted on said frame means for rotating said bracket means to steer the kit when used as an iceboat.

3. An iceboat kit according to claim 2 wherein said lever means is pivotally mounted on said frame means in front of said seat means for operation by the feet of the iceboat rider.

4. An iceboat kit according to claim 1, including third bracket means pivotally connecting said arms means to said frame means for rotation between an extended use position and a storage position against said frame means.

5. An iceboat according to claim 4 including rod means pivotally connecting said seat means to said frame means for rotation between use and storage positions.

* * * * *